US007206656B2

(12) United States Patent
Clayton et al.

(10) Patent No.: US 7,206,656 B2

(45) Date of Patent: Apr. 17, 2007

(54) GLASS OPTIMIZATION

(75) Inventors: Byron C. Clayton, Twinsburg, OH (US); Timothy B. McGlinchy, Twinsburg, OH (US); William V. Perry, Jr., Parma, OH (US); Paul Victor Dorsch, Warren, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 81 days.

(21) Appl. No.: 10/844,256

(22) Filed: May 12, 2004

(65) Prior Publication Data

US 2004/0236459 A1 Nov. 25, 2004

Related U.S. Application Data

(63) Continuation-in-part of application No. 10/688,654, filed on Oct. 17, 2003, now abandoned, which is a continuation of application No. 10/646,191, filed on Aug. 22, 2003, now abandoned.

(60) Provisional application No. 60/472,060, filed on May 20, 2003.

(51) Int. Cl.
*G06F 19/00* (2006.01)

(52) U.S. Cl. ...................... 700/157; 700/158; 700/171; 65/29.16

(58) Field of Classification Search ................ 700/171, 700/95, 180, 157, 99, 100, 158; 33/18.1, 33/32.3; 83/71; 65/174, 433
See application file for complete search history.

(56) References Cited

U.S. PATENT DOCUMENTS 4,162,907 A * 7/1979 Anderson .................. 65/29.17
4,709,483 A * 12/1987 Hembree et al. ............ 33/18.1
5,757,647 A * 5/1998 DeMichele ................. 700/171
6,298,275 B1 10/2001 Herman, Jr.
6,580,963 B2 6/2003 Susnjara
2003/0226433 A1 12/2003 Passant

OTHER PUBLICATIONS

Brochure distributed at the GlassBuild America Show held in Atlanta, GA between Mar. 12 and 14, 2003. 1 page.

* cited by examiner

*Primary Examiner*—Leo Picard
*Assistant Examiner*—Charles Kasenge
(74) *Attorney, Agent, or Firm*—Tarolli, Sundheim, Covell & Tummino LLP

(57) ABSTRACT

A glass cutting station having a controller that lays out a pattern of lites to be cut from set of glass sheets to fulfill the lite requirements of a multiple number of cutting batches. The controller identifies one or more underutilized glass sheets in a first set of glass sheets that have free space with no lites designated to be cut in the first batch. The controller also lays out a pattern of lites to be cut to fulfill the lite requirements of an additional or second batch in the number of batches by utilizing at least some of the free space on the underutilized glass sheets of the first set of glass sheets. Additionally the controller designates other glass sheets from which to cut other lites in the additional batch. If, after this process is performed, additional free space is identified, the controller can continue to lay out the sheet with standard or filler lites that fill up the additional underutilized space of a glass sheet.

33 Claims, 8 Drawing Sheets

GLASS OPTIMIZATION

CROSS REFERENCE TO RELATED APPLICATION

The present application is a continuation in part application claiming priority from U.S. patent application Ser. No. 10/688,654, entitled GLASS OPTIMIZATION, filed Oct. 17, 2003, now abandoned which is a continuation of U.S. patent application Ser. No. 10/646,191, entitled GLASS OPTIMIZATION, filed Aug. 22, 2003, now abandoned which claims priority from U.S. Provisional application Ser. No. 60/472,060, entitled "Window or Door Glass Optimization" filed May 20, 2003.

FIELD OF THE INVENTION

The present invention concerns apparatus and method for cutting glass lites from large sheets of glass to achieve the highest yield.

BACKGROUND ART

A manufacturer of products that incorporates glass, such as a window manufacturer, receives orders for products which require different sizes of glass lites. The orders for the glass are separated and grouped into scheduled production batches. For each production batch, the glass lites are further grouped and arranged to be cut from large stock glass sheets to achieve the highest yield. The process of grouping and arranging glass lites to be cut from stock glass sheets to achieve the highest yield is called glass optimization.

Glass optimization is usually performed by a computer executing a computer program one hour to one day prior to use at the cutting station. The output from the glass optimization process is a control program that is sent to a computer-controlled cutting table. The glass optimization software outputs a computer program that optimizes one or more production batches containing patterns of lites arranged on stock glass sheets. The cutting table automatically scores the glass according to each pattern. Each production batch normally contains one or more glass layout patterns that provide a lower yield than desirable.

These Low Yield Patterns or Low Yield Sheets significantly reduce the yield of entire production batches resulting in higher manufacturing costs due to wasted glass. Waste is particularly expensive when manufacturing windows from increasingly popular specialty glasses such as Low-E or self-cleaning materials.

Today, there are several existing methodologies used to increase glass yields. Unfortunately, each method presents one or more problems to manufacturing operations. The methods and their resulting problems are described below.

a) Standard dimensioned lites called filler lites can be introduced to scheduled production batches to fill-in unused space on the stock glass sheets. The glass optimization software determines where filler lites can be inserted when creating the initial programmed patterns. Because fillers are inserted prior to the actual manufacturing process, the number and type of filler lites rarely meet actual production demand. Too few filler lites starve production lines while too many fillers create storage and quality problems.

b) Adding different sizes of large stock sheets also increase yield. This allows the glass optimization software to pick the size of stock sheets that produce the best yield. Although this method enhances yield, it also increases inventory space and costs while decreasing throughput (more glass sizes to shuttle in and out).

c) Certain cutting tables allow the lites from Low Yield Sheets to be added to manually entered or selected lites and re-optimized to increase yields. Although these features provide excellent flexibility and increase yield, they also cause the cutting table to remain idle during the manual entry process. This greatly reduced production throughput and efficiency.

SUMMARY OF THE INVENTION

A system is disclosed for heuristically optimizing the arrangement of lites to be cut from said glass sheets. The system defines a number of batches wherein each batch requires a specified number and type of glass lites. The system lays out patterns of lites to be cut from large stock glass sheets to fulfill the lite requirements for the first batch within the number of batches.

The system also identifies one or more underutilized glass sheets in the first batch that have free space with no lites left to be cut in the first batch. The system also lays out a pattern of lites to be cut to fulfill the lite requirements of one or more additional batches in the number of batches by utilizing at least some of the free space on the underutilized glass sheets of the first batch. Additionally the system designates other glass sheets from which to cut other lites in the additional batches.

Practice of the invention significantly increases yield without the problems associated with existing methodologies discussed above such as inadequate supply, excessive inventory costs, increased storage requirements, decreased quality and reduced production throughput.

These and other objects and advantages of the system constructed in accordance with an exemplary embodiment of the invention is more completely described in conjunction with the accompanying drawings.

BEST MODE FOR PRACTICING THE INVENTION

The disclosed invention provides an integrated software and apparatus solution for increasing the yield of production runs during window or door manufacture, or other manufacture requiring glass lites. An exemplar system automatically recognizes and optimizes Low Yield Sheets by adding glass lites from other production batches as well as lites entered or selected at a cutting station 10. The exemplary system also automatically creates, tracks, selects and re-cuts remnant sheets of glass if the process is unable to add sufficient lites to eliminate Low Yield Sheets from a production batch.

Figure 1:
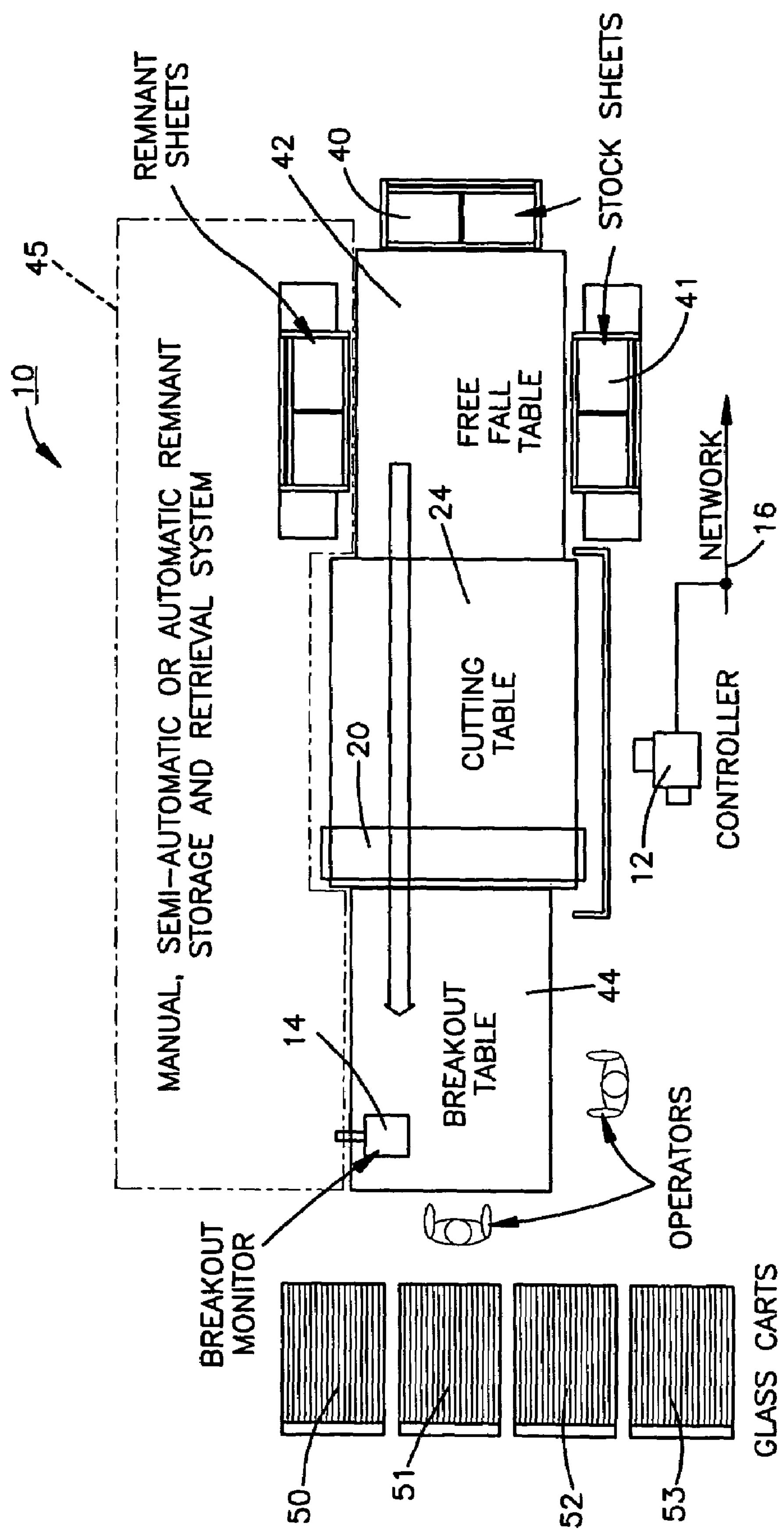
FIG. 1 is a schematic representation of a cutting station located within a window or door manufacturing facility.

The FIG. 1 cutting station 10 includes a controller 12 that provides the cutting station operator an option of easily selecting filler lite sizes that can be automatically inserted into each production batch. The controller is coupled to a display or breakout monitor 14 that graphically alerts the cutting table operator(s) which cart and slot to place each lite as it is cut. The controller 12 and breakout monitor 14 also graphically alert the cutting table operator(s) where to place or remove remnant sheets for subsequent processing. The controller and breakout monitor also graphically alert the cutting table operator(s) which temporary cart slot to place or remove lites for subsequent processing.

In addition, the system tracks and reports yield, throughput and filler lite information in real-time to the cutting table display or monitor 14 as well as other computers by means of a network 16 which allows the controller 12 to communicate with other computers in the manufacturing facility. These other computers include computer-controlled manufacturing devices at other workstations and computer software for controller the entire manufacturing process.

FIG. 1 depicts representative apparatus for optimizing the fabrication of products that include lites cut from said glass sheets. The cutting station 10 including a moveable cutting head 20 supported for movement with respect to a glass sheet 22 (FIG. 3) positioned on a cutting table 24 with respect to the cutting head 20 from which glass lites are cut. The same controller 12 that updates the display or monitor 14 is also responsible for controlling the movement with respect to the cutting table of the cutting head 20.

Figure 3:
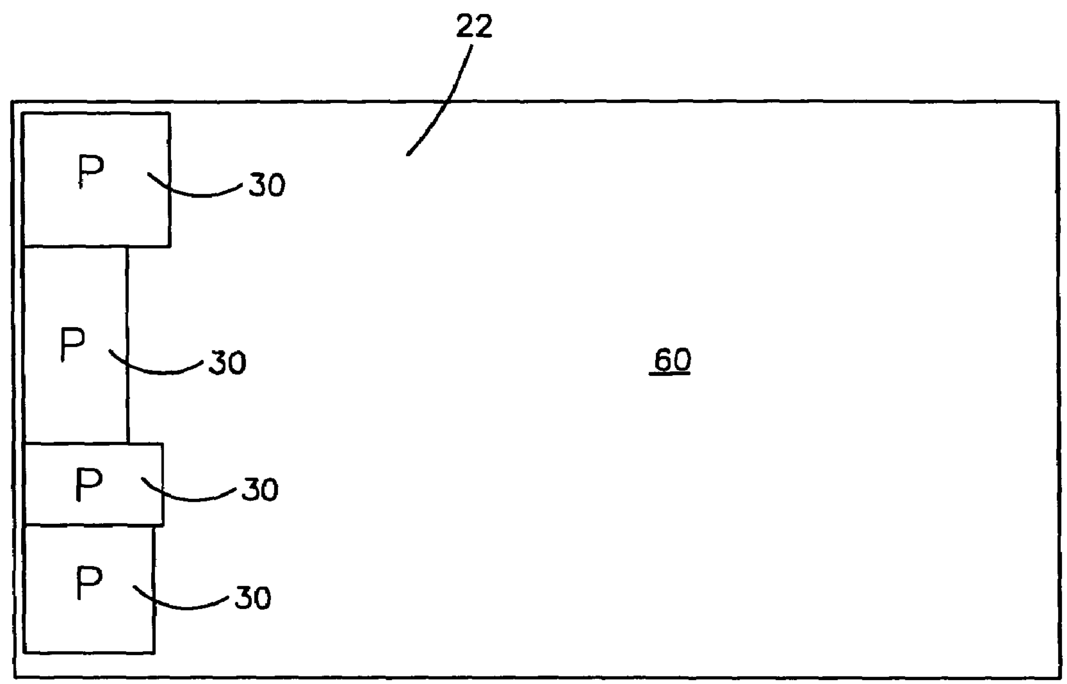
FIGS. 3–9 are schematic depictions of glass sheets illustrating layouts of lites to be cut from the sheets at the cutting station.

FIG. 3 shows a representative sheet 22 having a number of lites 30–33 scheduled to be cut from specified locations on the sheet 22. Typical dimensions (prior to cutting) for a sheet such as the sheet 22 shown in FIG. 3 are 72 inches by 84 inches. Other standard sizes are 96" by 130" and 48" by 60".

The sheet 22 is removed by an operator from one of two racks 40, 41 (FIG. 1) positioned in relation to the cutting table 24. The sheet is placed on its edge at the side or at the end of a free fall table 42. The table 42 has a relatively smooth and soft top surface onto which the glass sheet falls. From its position on the table the sheet is automatically transferred to the cutting table 24. While on the cutting table 24 the sheet 22 is cut by the cutting head and then moved to a break out table 44. At the break out table 44 an operator breaks out the lites from the glass sheet 22.

As seen in FIG. 1, a number of carts 50–53 are positioned with respect to the cutting station 10 for storing lites as they are cut from a glass sheet 22 by the cutting head 20. The controller 12 or another ancillary computer includes software running on a processor which performs a number of tasks used by the system for making the glass cutting process more efficient. The controller lists a number of batches wherein each batch requires a specified number and type of glass lites for use in fabricating products in an associated job. The controller 12 (or ancillary computer) and breakout monitor 14 displays a pattern of lites to be cut from a first set of glass sheets to fulfill the lite requirements for one batch and during cutting prompts the operator to place the lites for that job into a single one of the four carts 50–53.

The controller 12 or ancillary computer is capable of recognizing and adjusting to under utilized glass sheets. In accordance with one exemplary embodiment of the invention, under utilized glass sheet is any sheet where less than 70% of the sheet has lites allocated for a given job. The sheet 22 depicted in FIG. 3 is an underutilized glass sheet having free space 60 with no lites designated to be cut for the batch that the sheet 22 is associated with. The four lites 30 that have been designated for a particular batch have been labeled with the designation “P” to indicate that they are associated with a particular production batch. These four lites 30–33 take up much less than the 70% cutoff.

As explained more fully below, the controller 12 or ancillary computer responds to recognition of such an underutilized sheet by laying out a pattern of lites to be cut to fulfill other lite requirements, possibly the other requirements one or more additional batches in a queue of such batches. The controller utilizes at least some of the free space 60 on the underutilized glass sheets of a first batch by designating usage of the free space 60 for other batches. The controller 12 or ancillary computer then completes the designated lites for those other or subsequent batches by laying out other glass sheets from which to cut other lites in that subsequent batch(es). This process, of course, takes into account the lites that have already been designated from the underutilized sheet or sheets of the previous batch or batches.

Theory of Operation

The software running on the controller or ancillary computer begins heuristically optimizing a next production batch in a queue of such batches by identifying a Low Yield Sheet if it exists. The controller or ancillary computer automatically calculates how to fill the sheet according to a list of priorities exemplified by the flowchart 110 in FIGS. 10A and 10B. To help illustrate the process of FIGS. 10A and 10B, in FIGS. 3–9 the glass lites are labeled with designators depending on where in the list of priorities these lites are identified for inclusion onto a Low Yield Sheet.

Figure 4:
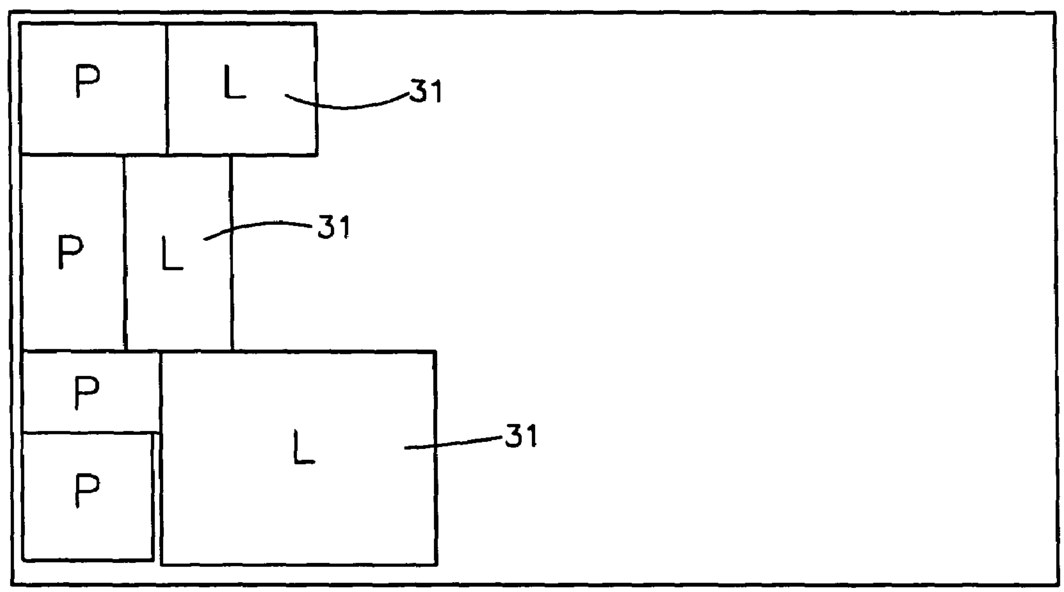

The highest priority is a regular production batch lite P. A next highest priority is a local remake or MDI lite L. Three such lites 31 are depicted in FIG. 4. An MDI lite is typically made in response to a request due to breakage or a prior knowledge of a need by the cutting station operator. MDI lite information is entered by the operator at controller 12 using a keypad. A local remake is typically required because a lite is broken at the cutting table. Local remake information is entered by the operator using pushbuttons to highlight the lite that needs to be replaced on the breakout monitor or on the controller display.

Figure 5:
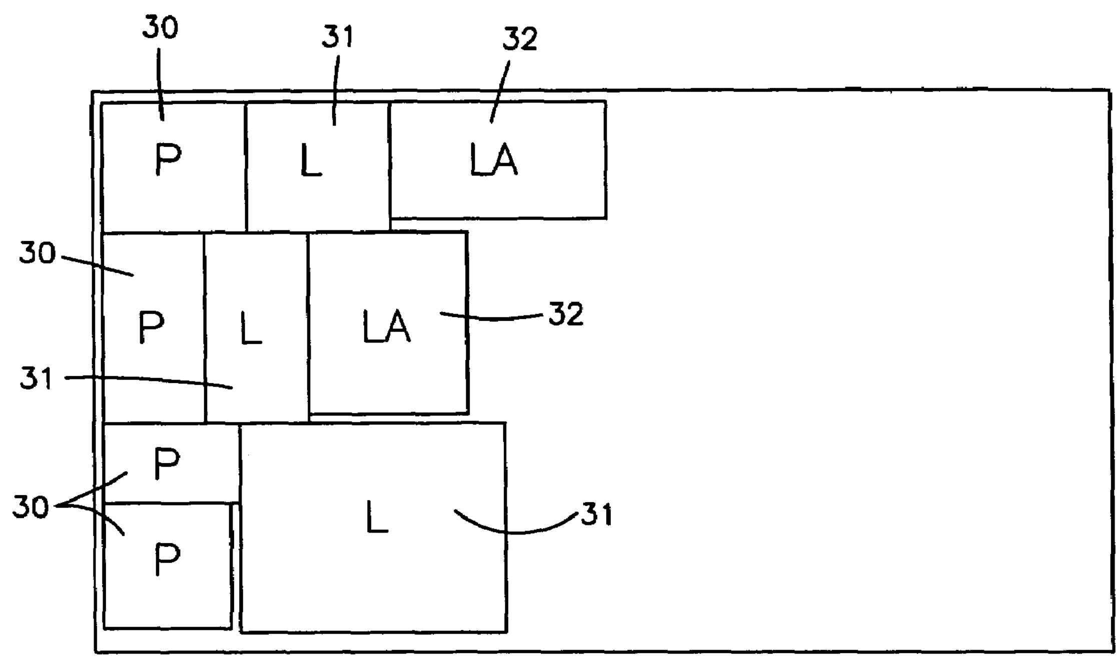
Figure 6:
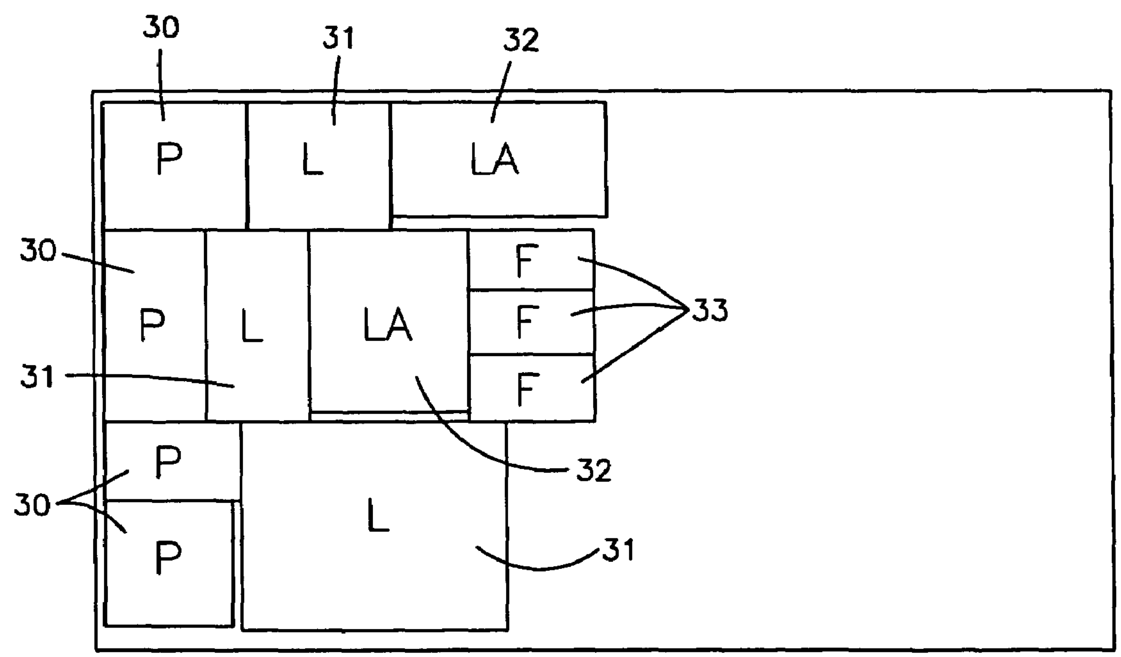
Figure 7:
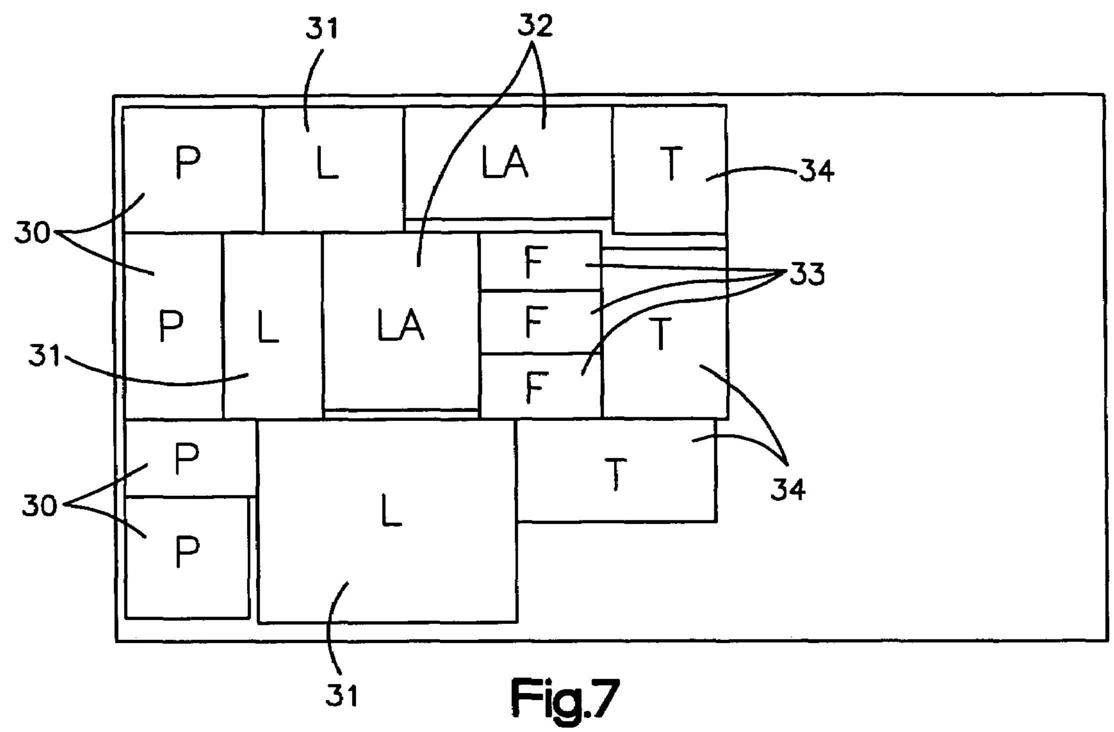
Figure 8:
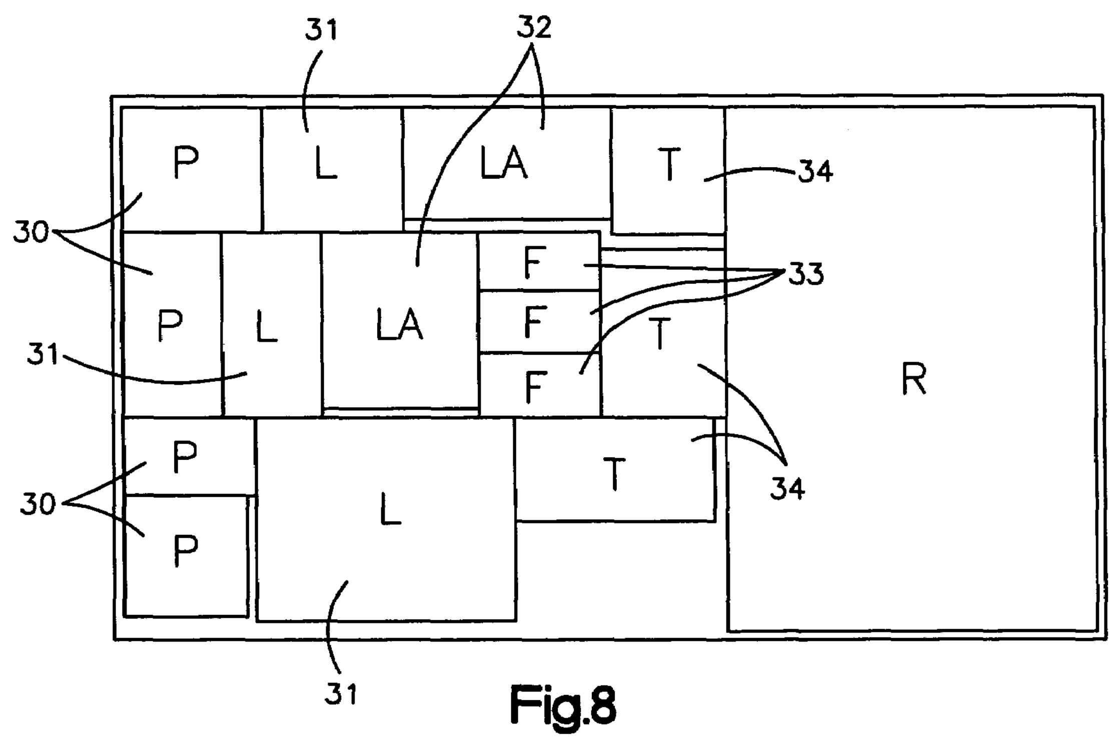
Figure 9:
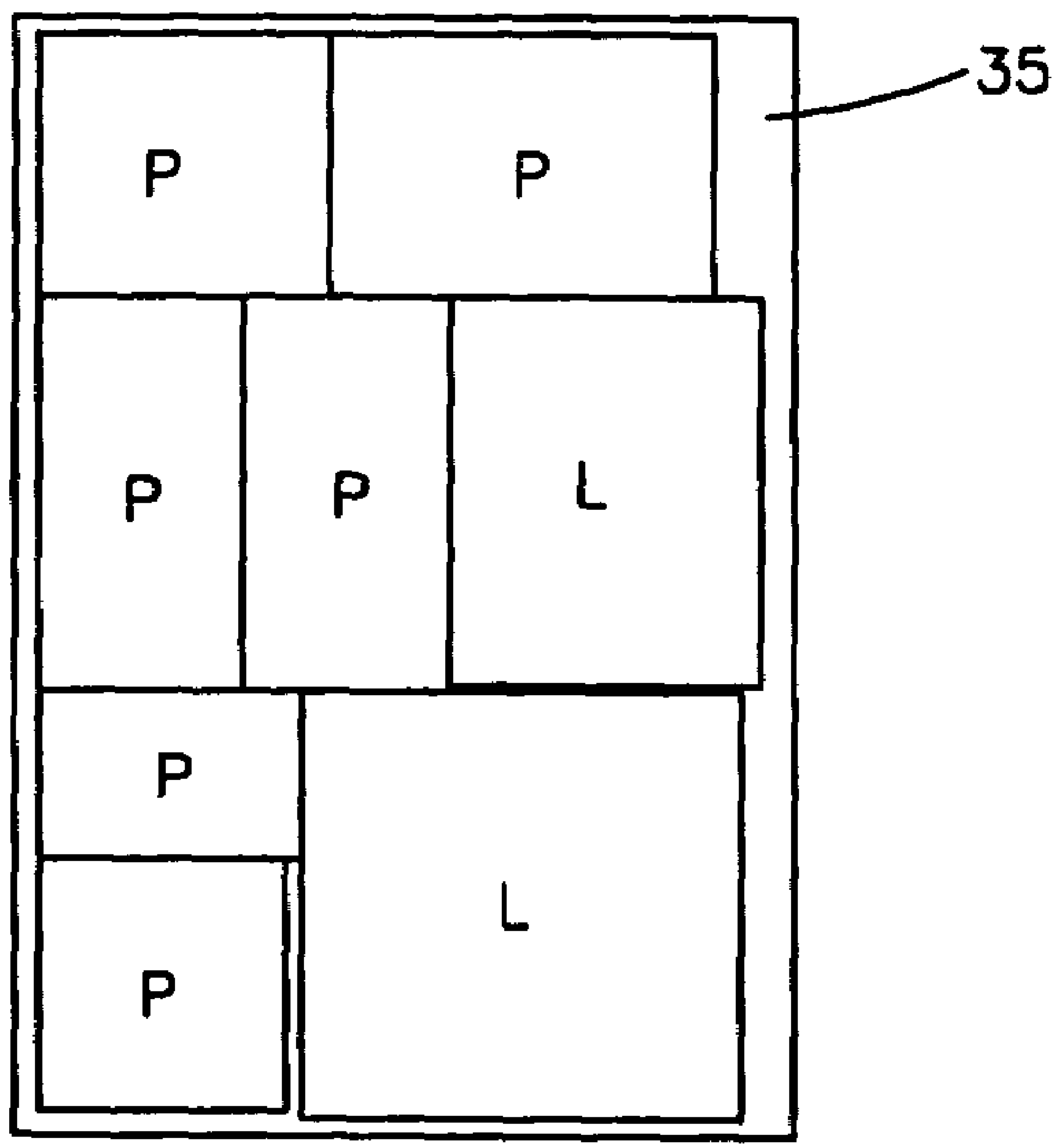

A next highest priority lite inserted into the Low Yield Sheet is a production run look ahead lite LA. Two such lites 32 are depicted in FIG. 5. A typical manufacturing sequence of batches will have need for lites from the same type of glass in multiple batches. The system recognizes this need by inserting lites for subsequent batches on a Low Yield Sheet. These are called look ahead lites LA because the system “looks ahead” to subsequent jobs for lites to add to a Low Yield Sheet. As the operator breaks out the lites from a sheet the viewing monitor 14 tells the operator where he or she should put that look ahead lite. This is typically in the form of a cart slot number at the cutting station.

Figure 2:
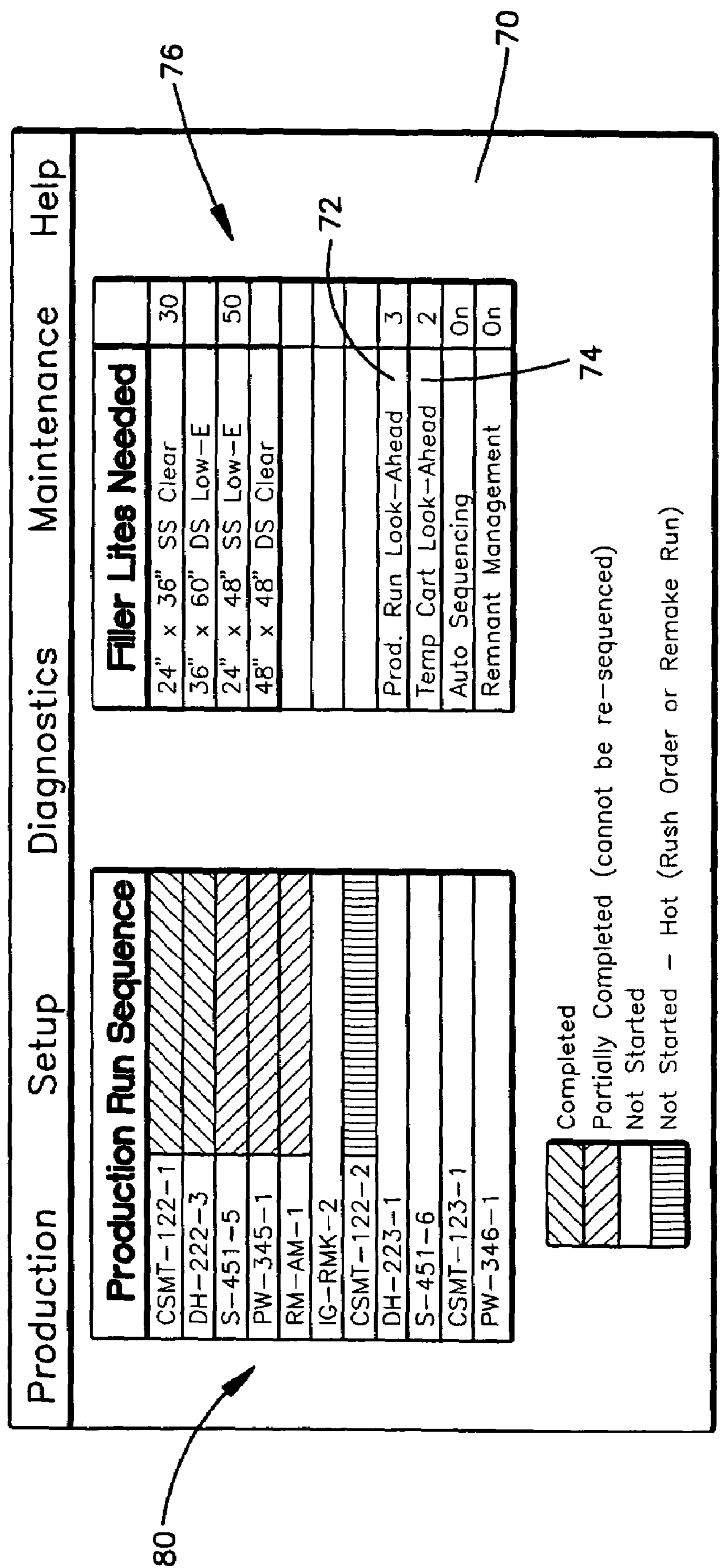
FIG. 2 is a schematic of a user interface by means of which an operator sets up cutting operations at the FIG. 1 cutting station.

The next priority lite added to a Low Yield Sheet is a filler lite F. Filler lites are certain sizes and glass types that are commonly used in production. The system adds filler lites to Low Yield Sheets to increase yield. They are stored in close proximity to the cutting table. The number of filler lites needed is noted on the display. (See FIG. 2) As the number of filler lites that have been cut increases, the corresponding number of filler lites that are needed decreases and the video display will be updated until the desired number of filler lites has been cut. When a production batch calls for a lite with the size and glass type of a filler lite, an appropriate filler lite can be quickly retrieved from the storage area. Although the depictions of FIGS. 3–9 suggest that the controller places lites of a similar nature together on the glass sheet, the controller may rearrange the lites on a pattern to increase yield and may for example intersperse lites of different types next each other on the glass sheet.

The next priority added to a Low Yield Sheet is a temporary lite T. A temporary lite is designated as a lite to be stored in a temporary cart until a cart for it's production batch has been placed at the cutting table in the positions illustrated in FIG. 1 by carts 50, 51, 52, or 53.

The next priority added to a Low Yield Sheet is a remnant R. A remnant is designated as the remaining area of the large stock glass sheet that can be stored and used later in the optimization process. The invention will instruct the cutting table if and how to cut the remnant for easier storage and store the position and size information of the remnant for subsequent optimization.

Figure 10A:
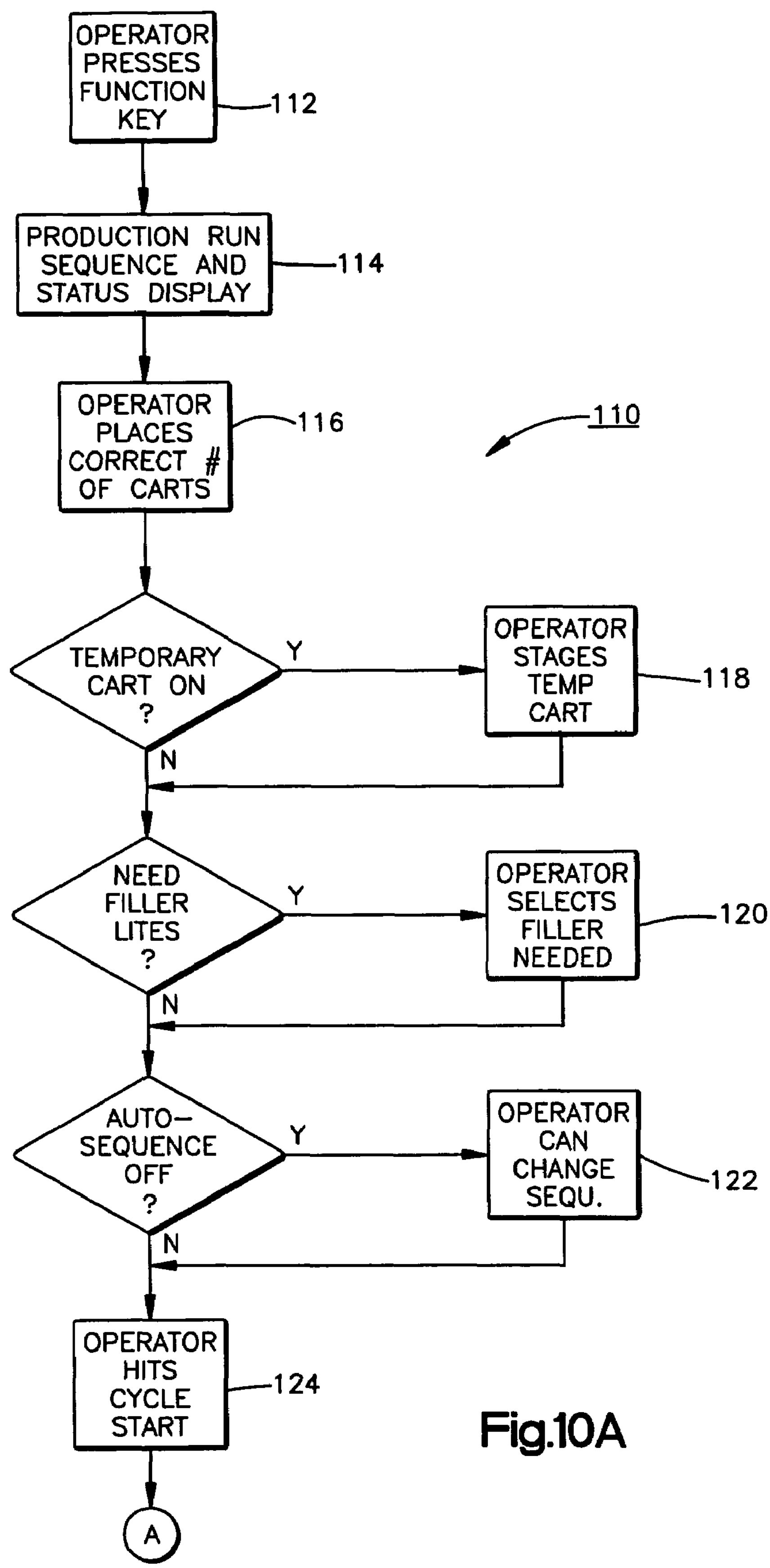
FIGS. 10A ad 10B are flowcharts for optimizing lite layouts on glass sheets of a production batch.
Figure 10B:
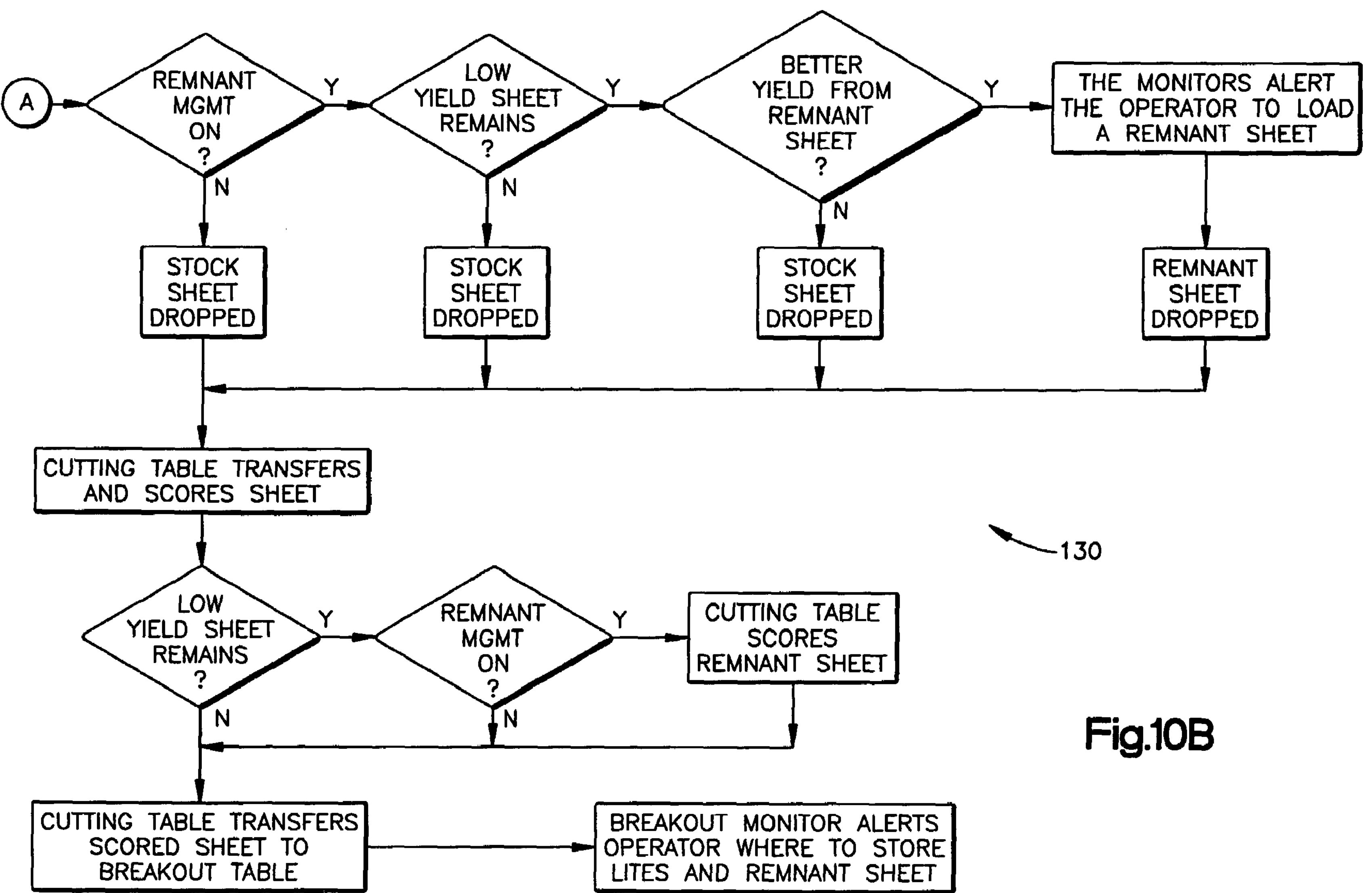

During the optimization process 110 (which takes place prior to cutting) depicted in the flow chart of FIGS. 10A and 10B, the controller optimizes glass usage to reduce waste during glass cutting utilizing the sequence of priorities. The invention may also heuristically change the sequence of priorities based on input gathered via a computer network from other machines or programmable devices.

The cutting table operator presses 112 a function key on the controller. The controller responds by displaying 114 a graphical display 70 similar to FIG. 2. Listed on the display 70 is a Production Run Look-Ahead Parameter 72. This parameter corresponds to how many production batches the controller will look-ahead for lites to increase the yield on Low Yield Sheets. The yield (as a percentage) that the controller uses to determine a Low Yield Sheet is entered during the initial setup of the invention. Each production run typically corresponds to one cart. Therefore, if the Production Run Look-Ahead parameter displays the number '3', the operator knows to place 116 three carts 50, 51, 52 around the cutting table.

The display 70 (FIG. 2) also includes a Temporary Cart Look-Ahead Parameter 74. If a number other than 0 is displayed, the operator places 118 a temporary cart or carts (cart 53 for example) at the cutting table. The displayed parameter indicates the number of additional production runs (in addition to the production run look ahead) to be checked with the look-ahead function. Assuming the temporary cart look ahead is other than zero, the Breakout Monitor will display which slot in the temporary cart the operator should place the lites identified from those production batches. In a typical application there is only one temporary cart for storing lites from multiple additional batches. When those additional batches are cut, the operator is prompted to move an already cut lite from its slot in the temporary cart and moved to its appropriate (and now in place) production run cart location or slot.

The operator views the Filler Lites Needed table 76 and enters the desired number of filler lites. Whenever possible, the invention adds the sizes of filler requested to Low Yield Sheet until the requested amount of filler lites is satisfied.

The operator views the Auto Sequencing Parameter. If "off", the operator cannot change the order of the production batches in the queue. The order of the production batches will be determined by external software. If "on", the operator may rearrange 122 the order of any production batches not started. Color coding of the display of FIG. 2 indicates which production batches in a list 80 are not started.

The operator then presses 124 the cycle start button. The cutting table will begin the next production run in the queue. The invention automatically identifies Low Yield Sheets and will calculate how to get the best yield. The sequence of steps 130 depicted in FIG. 10B inform the operator which type of sheet to drop on the cutting table. The invention will follow a user-defined sequence of priorities to determine how to increase the yield by adding lites to the Low Yield Sheet from different sources. The invention adds lites from MDI (manual data input), local remake entry, future production runs and standard sizes (filler lites). The invention may also heuristically change the sequence of priorities based on input gathered via a computer network from other machines or programmable devices. If any Low Yield Sheets remain and the Remnant Management Parameter is "on", the invention will determine if the lites on the low yield sheet can more efficiently fit on a stored remnant sheet in a manner that eliminates the low yield condition. If so, the controller and breakout monitor alert the operator to load the corresponding stored remnant sheet from a remnant storage and retrieval system 45 having a cart for storing remnant sheets. The size and configuration of the Remnant Sheet Queue will be entered during the initial setup of the invention.

After the cutting table scores the sheet and it remains a Low Yield Sheets and the Remnant Management Parameter is "on" and there is room to store another remnant sheet on the remnant sheet cart, the system scores the largest rectangle possible in the unused area of the Low Yield Pattern. Via the breakout monitor, the system alerts the operator to transfer the remnant sheet to a manual, semi-automatic or automatic remnant storage and retrieval system 45. The breakout monitor also indicates which cart and slot (standard or temporary cart) to place each lite via text and color coding.

The operator presses another function key at the cutting table controller to return to the previous screen.

The invention also tracks and reports yield, throughput and filler lite information in real-time to the cutting table display as well as other computers, computer-controlled devices and computer software.

Although an exemplary embodiment of the invention has been described with a degree of particularity, it is the intent that the invention include all modifications and alterations from the disclosed design falling within the spirit or scope of the appended claims.

The invention claimed is:

1. A method for optimizing the cutting of lites from a plurality of glass sheets with an automated cutting apparatus comprising:

defining a plurality of production batches wherein each production batch requires a specified number, size and type of glass lites for use in fabricating doors or windows in said production batch;

laying out a pattern of a first set of lites to be cut from a first set of glass sheets to fulfill the lite requirements for one production batch in said plurality of production batches;

identifying one or more underutilized glass sheets in the first set of glass sheets having free space with no lites in said first set of lites designated to be cut for fabricating doors or windows in the one production batch;

laying out a pattern of an additional set of one or more lookahead lites to be cut from the free space on the first set of glass sheets to fulfill the lite requirements of one or more additional production batches in said plurality of production batches by utilizing at least some of the free space on the underutilized glass sheets of the first set of glass sheets for lookahead lites and designating other glass sheets not in said first set of sheets from which to cut other lites in said additional production batches; and cutting out the first set of lites and lookahead lites from glass sheets of said first set of sheets with an automated cutting apparatus.

2. The method of claim 1 wherein the step of laying out a pattern of lites for a production batch is performed by a programmable device and wherein the programmable device interfaces with a computer monitor and additionally providing a color coding identifier on said monitor for identifying different lites from different production batches.

3. The method of claim 1 wherein the free space on the underutilized glass sheets is used to fulfill the lite requirements of more than one additional production batch in the plurality of production batches.

4. The method of claim 1 wherein the free space on the underutilized glass sheets is also used to provide filler lites of a specified size not designated for use in any particular production batch but instead on an as needed basis.

5. The method of claim 4 wherein a display is used to indicate to an operator how many of the filler lites to create.

6. The method of claim 2 wherein the user interface allows the user to add lites to a layout in the event the user knows of a specific need that can be accommodated by unused space on an underutilized glass sheet.

7. The method of claim 1 additionally comprising instructing an operator regarding placement of the lites cut from the glass sheets for different production batches into appropriate storage units positioned with respect to the cutting apparatus.

8. The method of claim 1 wherein in addition to laying out a pattern of lookahead lites to be cut from the first set of glass sheets, one or more remnant sheets are cut from free space of underutilized sheets from the first set of glass sheets for later use in providing glass lites.

9. The method of claim 1 wherein the first set of glass sheets are standard size glass sheets and non-standard size remnant sheets are also identified for cutting from the free space of the one or more underutilized glass sheets.

10. The method of claim 9 wherein an operator is prompted to place a remnant sheet onto a cutting table from a storage unit to fulfill a requirement of one of said plurality of production batches.

11. The method of claim 1 wherein the free space of an underutilized glass sheet is filled with different types of lites which have different type priorities and further wherein a controller heuristically changes the type priority of said lites based on input gathered via a computer network from other machines or programmable devices.

12. The method of claim 11 wherein the different type of lites for filling free space on an underutilized glass sheet comprises sequential production batch lites, filler lites, remake lites, or temporary lites from other batches.

13. Apparatus for optimizing the fabricating of products that include lites cut from a plurality of glass sheets comprising:

- a) a cutting station including a moveable cutting head supported for movement with respect to a glass sheet positioned with respect to the cutting head from which glass lites are cut;
- b) a plurality of storage units positioned with respect to the cutting station for storing lites as they are cut from sheets of glass by the cutting head;
- c) a controller and/or ancillary computer including a programmable device for:
  - i) defining a plurality of batches wherein each batch requires a specified number, size and type of glass lites for use in fabricating doors and windows in a job;
  - ii) laying out a a first set of lites to be cut from a first set of glass sheets to fulfill the lite requirements for one batch in said plurality of batches;
  - iii) identifying one or more underutilized glass sheets in the first set of glass sheets having free space with no lites designated to be cut in the one batch;
  - iv) laying out a pattern of one or more lookahead lites to be cut to fulfill the lite requirements of one or more additional batches in said plurality of batches by utilizing at least some of the free space on the underutilized glass sheets of the first set of glass sheets and designating other glass sheets from which to cut other lites in said one or more additional batches;
  - v) controlling the cutting head to cut out the first set of lites and the one or more lookahead lites from the first set of glass sheets; and
  - vi) instructing an operator regarding placement of the first set of lites and the lookahead lites into appropriate storage units positioned with respect to the automated cutting apparatus.

14. The apparatus of claim 13 additionally comprising a computer monitor that uses a color coding scheme to identify different lites from different batches.

15. The apparatus of claim 13 additionally wherein the controller allocates the free space on the underutilized glass sheets is used to fulfill the lite requirements of more than one additional batch in the plurality of batches.

16. The apparatus of claim 13 additionally wherein the controller allocates the free space on the underutilized glass sheets is used to provide lites of a specified size not designated for use in any particular batch but instead on an as needed basis.

17. The apparatus of claim 13 additionally comprising a viewing monitor and wherein the controller comprises an interface for displaying images of a glass sheet layout on said viewing monitor.

18. An automated control system for a glass cutting station for use in cutting glass lites from a plurality of standard size glass sheets moved to the cutting station comprising:

a programmable controller for:

- a) defining a plurality of batches wherein each batch requires a specified number, size and type of glass lites for use in fabricating doors or windows in said batches;
- b) laying out a pattern of lites to be cut from a first set of standard size glass sheets to fulfill the lite requirements for one batch in said plurality of batches;
- c) identifying one or more underutilized glass sheets in the first set of standard size glass sheets having free space with no lites designated to be cut in the first batch; and
- d) laying out a pattern of one or more lookahead lites to be cut to fulfill the lite requirements of one or more additional batches in said plurality of batches by utilizing at least some of the free space on the underutilized glass sheets of the first set; and
- e) designating other glass sheets not in said first set of standard size glass sheets from which to cut other lites in said one or more additional batches.

19. The control system of claim 18 wherein the free space of a glass sheet is filled with different type of lites which have different type priorities and further comprising a computer network of other machines or programmable devices for communicating information to the controller for adjusting the priorities.

20. The control system of claim 19 wherein the different type of lites for filling free space on a sheet comprises sequential batch lites, filler lites, remake lites, remnant lites from a remnant sheet, or temporary lites from other batches.

21. A computer readable medium for storing computer executable instructions for use in optimizing the fabrication of windows or doors that include lites cut from a plurality of glass sheets, said medium comprising instructions for:

defining a plurality of production batches wherein each production batch requires a specified number, size and type of glass lites for use in fabricating doors or windows in said production batch;

laying out a pattern of a first set of lites to be cut from a first set of glass sheets to fulfill the lite requirements for one production batch in said plurality of production batches;

identifying one or more underutilized glass sheets in the first set of glass sheets having free space with no lites in said first set of lites designated to be cut in for fabricating doors or windows in the one production batch;

laying out a pattern of an additional set of one or more lookahead lites to be cut from the free space on the first set of glass sheets to fulfill the lite requirements of one or more additional production batches in said plurality of production batches by utilizing at least some of the free space on the underutilized glass sheets of the first set of glass sheets for lookahead lites and designating other glass sheets not in said first set of sheets from which to cut other lites in said additional production batches; and cutting out the first set of lites and lookahead lites from glass sheets of said first set of sheets with an automated cutting apparatus.

22. The computer readable medium of claim 21 further comprising instructions for color coding lites on a viewing monitor for identifying different lites from different production batches.

23. The computer readable medium of method of claim 21 wherein the instructions that identify the free space on the underutilized glass sheets attempts to fulfill the lite requirements of more than one additional production batch in the plurality of production batches.

24. The computer readable medium of claim 21 wherein the instructions analyze free space on the underutilized glass sheets to provide filler lites of a specified size not designated for use in any particular production batch but instead on an as needed basis.

25. The computer readable medium of claim 21 wherein the instructions further include instructions for controlling a viewing display to indicate to an operator how many of the filler lites to create.

26. The computer readable medium of claim 25 wherein the instructions create a user interface on the viewing display for allowing the user to add lites to a layout in the event the user knows of a specific need at the time an underutilized glass sheet is identified.

27. The computer readable medium of claim 21 additionally comprising instructions that instruct an automated cutting station to cut out lites from the glass sheets and instructions for prompting an operator regarding placement of the lites into appropriate storage units positioned with respect to cutting station.

28. The computer readable medium of claim 21 wherein in addition to laying out a pattern of lites to be cut from the first set of glass sheets the instructions identify a set of one or more remnant sheets from free space of the first set of glass sheets for subsequent use in making lites.

29. The computer readable medium of claim 21 wherein the instructions identify non-standard size remnant sheets to be cut from free space of the first set of glass sheets.

30. The computer readable medium of claim 29 wherein the instructions prompt an operator to place a non-standard remnant sheet previously cut from a standard size sheet onto a cutting table from a storage unit to fulfill a requirement of one of said plurality of batches.

31. The computer readable medium of claim 21 wherein the free space of an underutilized glass sheet is filled with different types of lites which have different type priorities and further wherein a controller heuristically changes the type priority of said lites based on input gathered via a computer network from other machines or programmable devices.

32. The computer readable medium of claim 31 wherein the different type of lites for filling free space on an underutilized alass sheet comprises sequential batch lites, filler lites, remake lites, or temporary lites from other batches.

33. The computer readable medium of claim 21 additionally comprising instructions for instructing an operator regarding placement of the lites into appropriate storage units positioned with respect to the cutting apparatus.

* * * * *